Nov. 25, 1969  R. W. PIERCE  3,480,784
ABSORPTION TESTER HAVING PORTS AND TRAPEZOIDAL ENCLOSURE WITH
PROVISION FOR ELIMINATING BUBBLES FROM THE OPTICAL TEST PATH
Filed Feb. 13, 1967  4 Sheets-Sheet 3
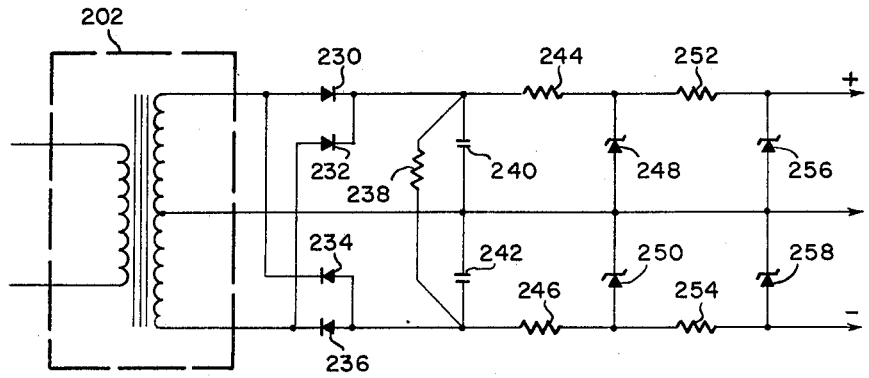
FIG__4
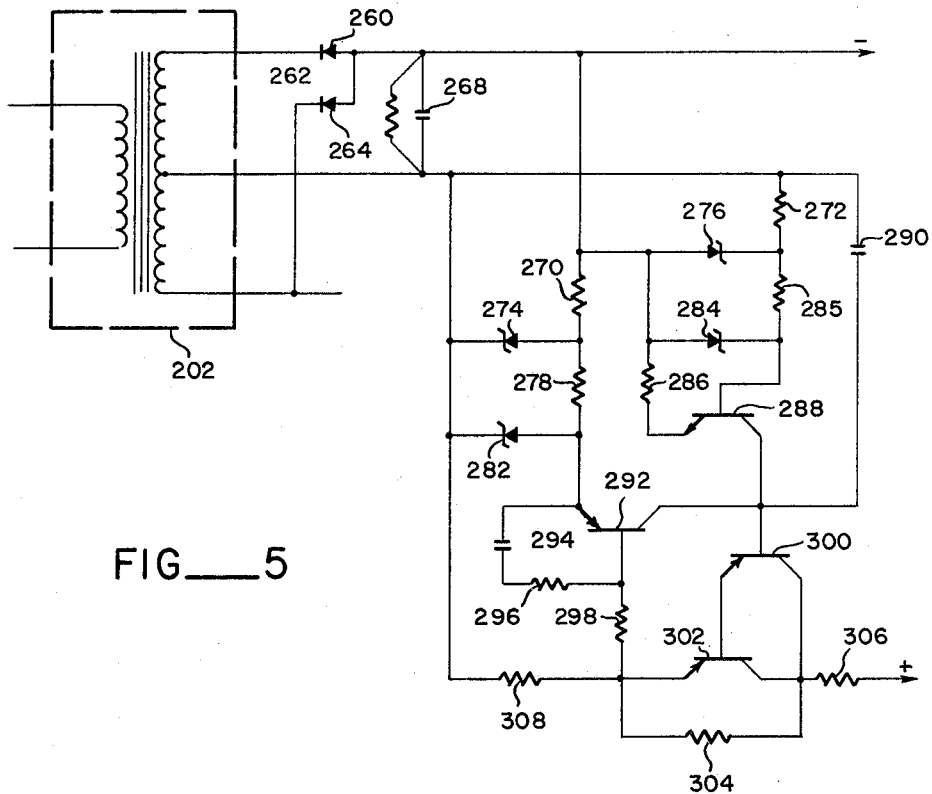
FIG__5
ROBERT W. PIERCE
*INVENTOR.*
BY
*ATTORNEYS*

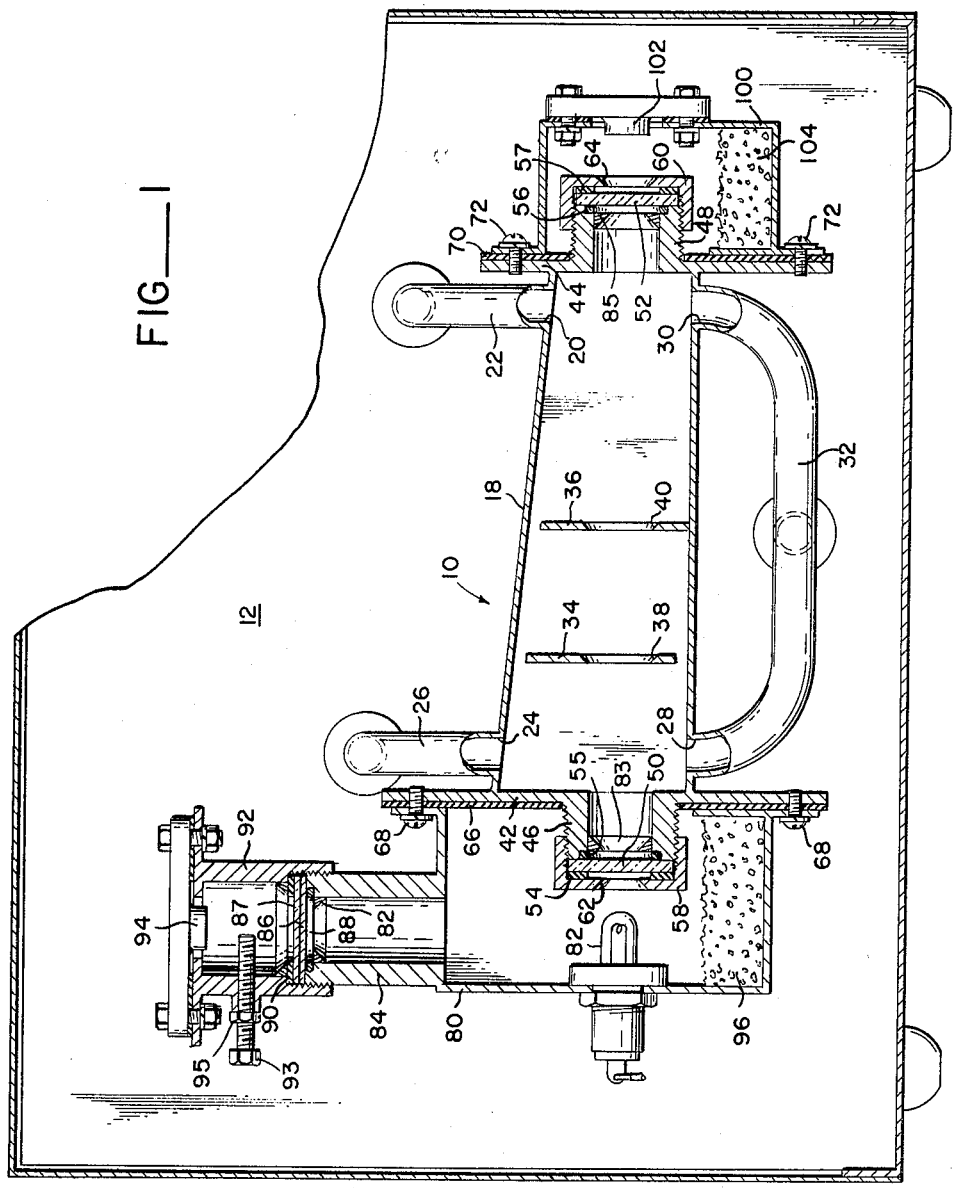

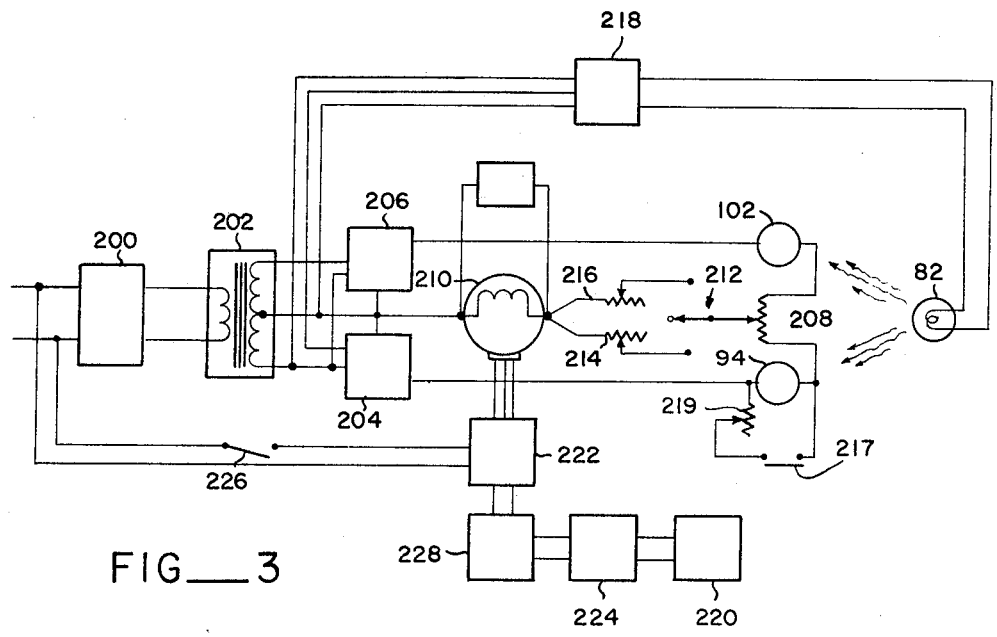
FIG__3
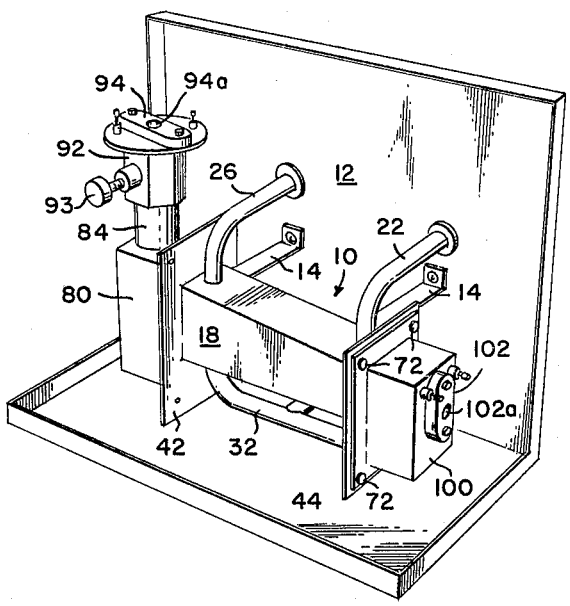
FIG__2
ROBERT W. PIERCE
INVENTOR.
BY
ATTORNEYS

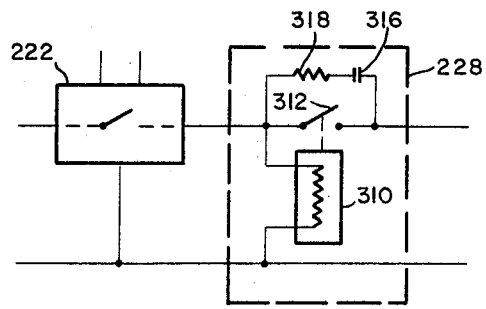
FIG__6
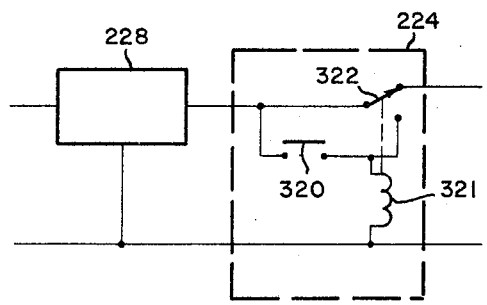
FIG__7
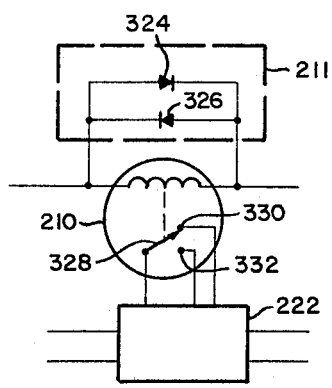
FIG__8
ROBERT W. PIERCE
*INVENTOR.*
BY
*ATTORNEYS*

United States Patent Office 3,480,784
Patented Nov. 25, 1969

3,480,784
ABSORPTION TESTER HAVING PORTS AND TRAPEZOIDAL ENCLOSURE WITH PROVISION FOR ELIMINATING BUBBLES FROM THE OPTICAL TEST PATH
Robert W. Pierce, Seattle, Wash., assignor to Sweden Freezer Mfg. Co., Seattle, Wash., a corporation of Washington
Filed Feb. 13, 1967, Ser. No. 617,011
Int. Cl. G01n 21/26
U.S. Cl. 250—218                5 Claims

ABSTRACT OF THE DISCLOSURE

An opacity change-sensing system is provided for use as a blood leak detecting device for sensing the presence of a patient's blood in the dialysis effluent from a blood weight exchange dialyzer. The device provides a bubble-free low fluctuating-reflection fluid flow path through which a light beam from a stabilized light source is longitudinally passed to an opacity-change sensing-photocell and an electrical circuit operable by the differential impedance output of two photocells to indicate changes in the sensed fluid opacity and to actuate over-ranging alarm circuitry upon the detection of blood in the dialysis effluent.

---

This invention relates to high-stability high-sensitivity fluid opacity-change sensing systems. More particularly this invention relates to such a high-stability high-sensitivity fluid opacity-change sensing system designed to sense the presence of small traces of blood in the dialysis solution effluent from a hemodialyzer.

In recent years, artificial kidneys have been developed to treat patients with acute renal failure and to rehabilitate patients who would otherwise die of chronic uremia. An essential feature of an artificial kidney system is a hemodialyzer wherein a patient's blood passes in counterflow to a dialysis solution on the opposite side of a semipermeable membrane. The solute containing dialysis solution removes wastes from the counterflowing blood stream by a solute exchange phenomenon. Waste containing dialysis solution effluent from the dialyzer is discarded.

One problem associated with the use of such hemodialyzers is that the semi-permeable membranes sometimes develop leaks for one reason or another which results in portions of the patient's blood being lost with the discarded dialysis solution effluent. Because an individual dialysis procedure takes place over a considerable period of time, measured in hours, so that all of the patient's blood is purified of wastes, a critical or even fatal amount of blood could be lost if a membrane leak were not promptly detected.

Because existing chemical tests for blood traces in dialysate require constant personnel attendance to permit continuous monitoring and prompt response to any such blood leak, so called optical "Blood Leak Detectors" have been used in the past to automatically monitor the opacity of the dialysis solution effluent from a dialyzer for detection of blood in the effluent. Such prior optical detectors had several deficiencies. Firstly such prior optical detectors were not sufficiently stable, sensitive, and accurate enough to properly monitor more than one dialyzer at a time. Therefore, a hospital facility employing a number of dialyzers also had to employ the same number of optical blood-leak detectors, which added to the cost of the service provided. Secondly such prior optical blood leak detectors were excessively sensitive to air bubbles in the effluent dialysate and would indicate frequent false blood-leak alarm conditions because of air bubbles in the dialyzer effluent when no blood leak actually existed. Since common practice has been to operate the dialyzer effluent outlet at a slight negative pressure, to prevent leaks of full strength dialyzing solution into the patient's blood and to facilitate the flow of the patient's blood between closely spaced pairs of thin semi-permeable dialyzing membranes, spontaneously evolved air bubbles are frequently present in the dialyzer effluent and thus indications of "false" blood-leak alarm conditions due to their presence were a constant irritation to the operating personnel and to the patient and could lead to inappropriate or even hazardous corrective action by the operating personnel. Thirdly the optical parts of such prior optical blood leak detectors could not be conveniently inspected, cleaned, repaired, and dehydrated in the field. Most dialysate water supply systems contain depositable minerals and corrosion products which deposit on the optical ports separating the effluent dialysate flow chamber from the light source and from the sensing photocell. Also the effluent dialysate may contain depositable sediments, organic body waste scums, or blood scums from dialyzer blood leaks. Thermal cycling of the fluid-opacity-sensing chamber between idle or empty states and the warmer dialyzing or hot sterilizing states can cause moisture condensation on the fluid-opacity-sensing optical parts unless the gaseous environments on the sides of the light source and the sensing photocell are sufficiently dehydrated. Fourthly such prior optical blood leak detectors were excessively subject to errors or false blood leak alarms from bubble opacity, spurious bubble reflections, fluid swirl refractions, particulate turbidity turbulence, or fluctuating wall surface reflections. Fluctuating wall surface and optical part reflections and fluid turbidities and refractions were caused by varying fluid flow conditions and by optical path distortions induced by excessive susceptibility to thermal variations, mounting stress variations, vibration, mechanical shock, pressure fluctuations and turbulence and refraction variances. At the high optical sensitivities desirable for optical blood leak detectors these effects tended to limit the stability and hence the usable sensitivity of prior optical blood leak detectors.

Fifthly such prior optical blood leak detectors did not automatically compensate for wide variations of photocell and photocell driver lamp lead-resistance variations to enable mounting the fluid opacity sensor unit either close to or up to 1,000 feet from the remainder of the circuit components as would facilitate a hospital wide centralized monitoring system.

Sixthly such prior optical blood leak detectors had only one calibrated opacity sensing range which, combined with the lack of stability and sensitivity, prevented the same blood leak detector from being used to sense either for blood in a multipatient dialysate effluent system or in a single patient dialysate effluent system.

Seventhly such prior optical blood leak detectors were not sufficiently immune to wide power line potential variations and to normal sensing-circuit loading-changes and circuit drifts to allow very high stabilization and accuracy under conditions of extreme variations which could accompany use of emergency power sources or exposure to poorly controlled environments. Eighthly such prior optical blood leak detectors had no simple positive convenient component aging rebalancing facilities or utilized special matched components or were so sealed against operator access that expensive portions of the blood leak detector systems either had to be sent back to the manufacturer for maintenance or became throw away items in the event of even small malfunctions. This resulted in excessive down time because prior optical blood leak detectors were prone to early failure, rapid calibration drifts or other malfunctions such as broken light, fluid, or antihumidity seals or to sealed optical parts clouded by condensation or by various deposits from the effluent dialysate. Ninthly such optical blood leak detectors either had no circuit-drift and lamp-resistance-variation compensating and reference photocell to counteract spurious effects on the principal opacity-change measuring-photocell or incorporated such a second reference and compensating photocell to sense the fresh dialysate inflow to the dialyzer in close conjunction with sensing of the opacity of the contaminated waste dialysate. Because blood dialysis patients often require treatment as a consequence of infections and because dialysis patients have much lowered resistance to infections, sensing of the purified dialyzer inflow dialysate in conjunction with the contaminated dialyzer effluent increased the risk of cross-infections between different patients being treated with the same dialysis equipment, particularly if both the inflow and outflow dialysate opacity sensor units had to be opened for repairs or periodic cleaning thus exposing the sterile inflow dialysate line to cross-infection from accumulated contaminated effluent dialysate deposits. Tenthly such prior optical blood leak detectors had optical opacity sensor units which were not adapted for easy disassembly to permit full sterilization after use preparatory to reshipment. Eleventhly such prior optical blood leak detectors had no safety automatic-resetting temporary alarm disable controls to permit operators to check, test, and adjust the blood detector during dialysis or to take corrective action following a blood-leak alarm without unnecessarily disturbing the patient or risking that the operator might forget to turn the blood-leak detector on again after the alarm condition had been cleared.

Twelfthly, the normal dialysate opacity-metering zero-adjustment and the full scale range-calibration adjustment of such prior optical blood leak detectors were excessively interactive so that rezeroing the meter on the normal dialysate opacity prior to each treatment tended to introduce errors into the full scale range calibration.

A primary objective of this invention is to provide a fluid flow opacity sensing system for use with hemodialyzers that does not suffer from the deficiencies noted above. A further objective is to provide such a system that is suitable for use in other fields where reliable, stable, sensitive, and accurate fluid opacity sensing is required.

FIG. 1 is a side elevation view in cross section of a preferred embodiment of the fluid opacity sensing apparatus portion of this invention.

FIG. 2 is an outside perspective view of the FIG. 1 apparatus.

FIG. 3 is an exemplary electrical circuit depicted in block diagram form for operating the FIGS. 1–2 apparatus.

FIG. 4 is a more detailed exemplary circuit preferred for regulated potential supplies 206 and 204 of FIG. 3.

FIG. 5 is a more detailed exemplary circuit preferred for regulated constant current supply 218 of FIG. 3.

FIG. 6 is a more detailed exemplary circuit suitable for bubble response time delay 228.

FIG. 7 is a more detailed exemplary circuit suitable for autoresetting manual alarm disable 224 of FIG. 3.

FIG. 8 is a more detailed exemplary circuit suitable for meter over ranging protection circuit 211 of FIG. 3.

This invention is an easily maintainable, field calibratable, high stability, high sensitivity fluid-opacity sensing and over-range alarm system especially suitable for use in the dailysis effluent line of a blood waste exchange-dialyzer for sensing the presence of a patient's blood in the dialysis effluent.

The device provides (a) a pair of long life photo-resistive photocells, one being used as an electrical and optical drift compensating reference photocell and the other being used as a fluid opacity-change sensing photocell, (b) means providing a bubble-free low fluctuating-reflection fluid flow path through which a light beam from a stabilized light source is longitudinally passed to the opacity-change sensing-photocell, and (c) a very high stability, easily calibratable, autoregulating, autocompensating, electrical circuit operable by the automatic drift-compensating differential-impedance output of the two photocells to indicate changes in the sensed fluid-opacity and to actuate over-ranging alarm circuitry all without being adversely influenced by normal power-line voltage-changes, by normal photocell driver-lamp filament-resistant changes, by small normal circuit-component temperature changes, or by normal environmental fluctuations.

The provision of two similar electro-optical characteristic high sensitivity photo-resistive photocells arranged in a symmetric error-cancelling circuit for a "non-amplified" differential-impedance controlled potential or current output virtually eliminates electrical circuit drifts or errors which could cause false readings. The provision of long life stable low-power-consumption component types and a sensing-circuit "keep-alive" provision effectively reduces the effect of any remaining incidental component characteristic drifts to a negligible level. Further the provision of an elongated rigid anti-reflection light baffled bubble-free flow-oriented flow path for opacity-change sensing significantly increases the usable stability, sensitivity, and accuracy of the system inasmuch as the sensing portion of the system has a much more stable and sensitive light-in-sensed-fluid path within which to average out the fluctuations of optical refraction and small particulate fluid-turbidity fluctuations which accompany flow swirls in the flowing fluid and a longer light-in-fluid path within which to sense small changes in fluid opacity.

The means providing the elongated high-stability fluid flow path comprises an opaque, rigid, corrosion-resistant, temperature-shock-resistant, elongated tubular member having a top wall that slopes upwardly from the fluid inlet to the fluid outlet. By having the inlet well above the opacity-sensing light-beam path, this construction permits air in the incoming fluid to rise to the top of the tubular member and migrate toward the fluid outlet without passing through the fluid-opacity-sensing light-beam. The fluid flow velocities and the fluid flow cross sections are relatively proportioned so as to maintain the fluid, which is in the fluid-opacity sensing-light-beam, substantially free of large bubbles at all fluid flow rates up to the maximum flow rate which must be sensed for optical opacity changes. Furthermore the over-range alarm-enabling circuit contains a bubble-response time-delay circuit which permits short bubble trains to pass through the opacity-sensing light-beam without actuating the over-range alarm. Therefore the opacity-sensing and over-range alarm systems are both remarkably insensitive to air bubbles. The light source is mounted at one end of the tubular member and the fluid-opacity sensing-photocell is mounted at the opposite end of the tubular member. A light beam from the source is passed through flat or lenticular, rigid, light, dialysate-and-temperature resistant, transparent or translucent optical windows, hereinafter called optical ports, that seal removably against opposite ends of the tubular fluid-flow-path member; and through interior optical direct-light apertures in opaque anti-reflection light-baffles which restrict the light-beam and block single-bounce bubble-surface and wall reflections which would otherwise affect the stability and accuracy of the desired fluid opacity-change indication. The light source, the exterior surfaces of the optical-ports, and the sensing and circuit-compensating-reference photocells are housed within light-tight easily-opened hermetically-sealed self-dessicated anti-humidity chambers so that light can not enter and so moisture laden air can not cause condensation on the optical parts during thermal cycling of flowing fluids or of the environment and thereby affect the accuracy of the fluid-opacity-change detector.

In the now preferred embodiment of its features, hereinafter described, a usable sensitivity of at least one part part million of blood in dialysate by volume per indicating meter division was achieved along with a sixteen hour long metering stability equivalent to a deviation of plus or minus two parts per million by volume of blood in dialysate. A one week stability deviation equivalent to less than plus or minus five parts per million of blood in dialysate by volume was also achieved.

With reference to FIGS. 1 and 2, a preferred embodiment of the optical-opacity-change sensor-portion of this invention comprises an optical-fluid-opacity detecting driver-sensor body 10 mounted in a housing 12 by mounting bars 14 and 16. The sensor body 10 comprises a tubular member 18 of trapezoidal configuration in longitudinal cross-section, having trapezoidal side walls and a sloping top wall. A fluid inlet port 20 is provided at the lower end of the top wall in communication with a fluid inlet tube 22. A fluid outlet port 24 is provided at the upper end of the top wall in communication with a fluid outlet tube 26. Two drain ports 28 and 30 are provided at opposite ends of the bottom wall in communication with the branches of a Y-tube 32. Two rigid interior anti-reflection light baffles 34 and 36 are provided in the interior of member 18 each having rigid, accurately-spaced, longitudinally-aligned, reflection-restricting, sharp-edged optical apertures 38 and 40 respectively. Anti-reflection light and fluid flow directing baffles 34 and 36 are provided to reduce spurious light reflections from wall and bubble surfaces and to insure principal fluid passage in member 18 quiescently longitudinally along the elongated opacity-sensing light-beam. Baffle 34 does not extend to the bottom wall of member 18 so fluid will not be trapped between the baffles when fluid is drained through drain ports 28 and 30 during shutdown cycling or during periodic cleaning or replacement of the fluid-retaining optical ports. The rigid left and right hand end walls 42 and 44 of member 18 are provided with hollow exteriorly threaded or otherwise rigidly fastened, outwardly-extending, rigid, fluid-retaining optical-port supports 46 and 48 respectively. Removable, fluid-tight, optical-ports 50 and 52 respectively are removably and sealably positioned against the open outer ends of optical port supports 46 and 48 by chemical and temperature resistant annular fluid seal rings 55 and 56 respectively and by low friction annular optical port strain-relief compressible cushion-rings 54 and 57 respectively, and by rigid mounting collars 58 and 60 respectively, threaded onto or otherwise rigidly fastened onto optical port supports 46 and 48 in a conveniently disconnectable manner. Conveniently removable rigid mounting collars 58 and 60 are provided with sharp-edged optical apertures 62 and 64 respectively in alignment with one another and with the intermediate sharp edged optical apertures 38 and 40.

The rigid left hand end wall 42 is provided with a quickly removable, rigid, light-tight, dehumidified optical chamber 80 that is hermetically sealed to end wall 42 by gasket 66 and bolts 68. A current-regulated photocell-driver-lamp 82 is rigidly and removably mounted on the wall of chamber 80 centered opposite optical aperture 62 such that a light beam therefrom can pass axially through the optical apertures and the optical ports 62, 50, 38, 40, 52, and 64 in that order. The upper wall of chamber 80 is provided with a rigid opaque tubular air and light tight optical port mounting extension 84 and two flat transparent or translucent light mask, neutral density filter, or optical aperture retaining air-tight optical-ports 86 and 87 removably and sealably mounted by annular fluid seal ring 88 and by low friction annular optical port strain-relief compressible cushion-ring 90 between extension 84 and an optical port mounting-collar 92 threaded or otherwise rigidly and removably fastened onto the upper end of extension 84. The top collar 92 also rigidly, removably, and sealably mounts a photo-resistive photocell 94 aligned axially with the light beam from photocell driver lamp 82. Optical masks, neutral density filter, or optical aperture retaining air-tight optical-ports 86 and 87 as necessary to accommodate the difference in the lengths of the light paths to photocells 94 and 102 and to accommodate normal manufacturing variances in component characteristics. Collar 92 also threadably or otherwise adjustably rigidly and lockably mounts a knurl headed threaded lockable adjustment 93 that can be inserted into or can be withdrawn from the light path to compensating and reference photocell 94 as necessary to initially set the photocell impedance difference balance for an approximate opacity-change-indication metering-zero. This provides a convenient system rebalancing control permitting rapid metering zero compensation for fairly large system unbalances arising from asymmetric component aging or from gradual but stable clouding of the optical ports in line with the opacity-change-sensing light-beam. The accessible and inspectable bottom portion of chamber 80 is filled with a considerable amount of quickly replaceable active non-sticking desiccant such as a coarse granule silica gel incorporating a saturation-indicating color-indicator to positively prevent moisture condensaton during thermal cycling in the event that the hermetic seal leaks slightly or in the event that moisture is trapped inside after replacement following a periodic inspection or access for some form of maintenance or cleaning. The rigid right hand end wall 44 is provided with an opaque removable light-tight air tight chamber 100 that is hermetically and removably sealed to rigid end wall 44 by gasket 70 and bolts 72. A photo-resistive photoelectric cell 102 is rigidly and removably mounted on the chamber wall centered opposite sharp-edged optical aperture 64 and axially in line therewith. The accessible and inspectable bottom portion of chamber 100 is filled with a considerable amount of quick replaceable active non-sticking desiccant such as a coarse granule silica gel incorporating a saturation-indicating color-indicator to positively prevent moisture condensation during thermal cycling in the event that the hermetic seal leaks slightly or in the event that moisture is trapped inside the chamber after replacement of the chamber following a periodic inspection or access for some form of maintenance or cleaning.

Light from photocell driver lamp 82 beams directly to photocell 94 and beams directly through chamber 18, passing from left to right through member 18, to photocell 102. The optical apertures 62, 38, 40, and 64 are knife edged in the direction shown to reduce variable spurious light reflections. To further prevent spurious fluctuating light reflections from affecting the response of fluid-opacity-change sensing photocell 102, properly spaced light baffles 34 and 36 are provided along the light-beam path through the fluid within member 18. Light baffles 34 and 36 terminate below the top wall of member 18 so that buoyant air bubbles in the inlet fluid can migrate along the top wall as they pass from inlet port 20 to outlet port 24 without interfering with the light beam directed through the antireflection baffled optical apertures. Additional sharp-edged optical apertures 82, 83, 85, and 87 are provided in conjunction with the optical ports to reduce the effect of spurious internal reflections between the surfaces of each optical port and to further eliminate spurious wall reflections. In order to achieve the requisite resistance to corrosion, pressure, thermal degradation, and thermal shock, special attention must be given to the use of suitable materials. In the now preferred embodiment flat polished Pyrex optical ports, fluoro-elastomer optical-port fluid-seals, and a rigid special corrosion resistant metal such as type #316 stainless steel for structures contacting the highly corrosive dialysate were used.

The exemplary high-stability, auto-regulating, auto-compensating, symmetrical electrical circuit depicted in FIG. 3 for the FIGS. 1–2 devices comprises an alternating-current line-voltage-regulating transformer 200 driving a centered-tapped-secondary step-down transformer 202 which in turn drives a pair of very high stability precision-regulated direct-current potential supplies 204 and 206 which put out equal and opposite potentials about the center-tap of transformer 202. Long-life high-sensitivity photoresistive photocells 94 and 102 are connected to the symmetric equal and opposite potential outputs of supplies 204 and 206 respectively, and to a resistance 208, having a variable meter fine zeroing tap, serially interconnecting the other ends of the photocells. A high-sensitivity high-impedance indicating meter-relay 210 with adjustable over and under-range alarm-set-points is connected to the center-tap of transformer 202 and to a three or more position full-scale sensitivity-range selecting switch 212 through one of a number of variable full-scale range-calibration resistors such as 214 and 216 and thence to the meter fine-zeroing-tap of resistor 208. A switch-actuated, adjustable-calibration resistance shunt, operation and full scale range calibration-test deflection-circuit 219 and 217 is connected in parallel with autocompensating reference photocell 94 to allow rapid operational and calibration checks on the instrument while it is in actual operation. The common contact of the full-scale sensitivity-range selector-switch 212 is connected to the adjustable meter fine-zeroing-tap of resistance 208 so that the meter 210 senses only the opacity change induced differential output of the reference and sensing photocells. A high-stability, precision-regulated, constant-current power supply 218 is connected to transformer 202 to power and stabilize the current to the photocell-driver-lamp 82. A meter-relay under-over-range set-point alarm circuit, actuated when an adjustable predetermined meter under or over-range alarm set-point is attained, comprises a meter-relay set-point under or over-range power enabling switching slave device 222, connected to line potential with an alarm system standby shutoff switch 221, which enables and drives a bubble-response time-delay circuit 228 which in turn drives an automatic safety-resetting "temporary" alarm-disable circuit 224 which in turn drives the alarm circuit 220.

In order to achieve the high stability and usable sensitivity necessary for the circuit of FIG. 3 to take full advantage of the potential precision of the device of FIGS. 1–2, the components of the circuit of FIG. 3 must be such that certain criteria are met. The voltage regulating transformer 200 should be capable of stabilizing its output potential to in the order of plus or minus one percent or better for power source potential-swings of plus or minus 20 percent about the nominal value to enable the use of more effective subsequent D.C. regulators in the potential and current regulated power supplies 204, 206, and 218. The resultant regulated outputs of the potential and current regulated power supplies 204, 206, and 218 should preferably have regulated outputs which are stabilized to plus or minus 0.02 percent or better under "worst-case" normal combinations of instrument "on-scale" meter and photocell loading changes plus power line potential-swings of plus or minus 20 percent about the nominal power line potential. The low potential sensing D.C. meter 210 should preferably have a high coil resistance, such as 5,000 ohms or higher, and a high sensitivity, such as 100,000 ohms per volt combined with a taut-band coil suspension for minimum frictional hysteresis errors and for immunity to over-ranging over-load drives which occur with over-range opacity changes accompanying heavy blood leaks, with startups and shutdowns of the fluid flow, and with certain adjustment and maintenance procedures. The photocells 94 and 102 should preferably be of a large-area, high dissipation, low-saturated-impedance, low-temperature-coefficient, linear-instrument-type, cadmium sulfide photo-resistive photocell type having relatively low blue light and infra-red radiation sensitivities. The photocell-driver-lamp 82 should preferably be of a low power consumption, very long life, low voltage, stable emission type, for example a type #755 lamp which is rated for 50,000 hours of life at the rated potential of 6.3 volts, and should have sufficient emission intensity to illuminate the photo-resistive photocells 94 and 102 to the desired impedance, for example to 10,000 ohms, as necessary to simultaneously operate in a fairly linear photocell response region, prevent undesirable photocell heating and present a sufficiently low driving impedance to the meter 210 and to the full scale range calibration resistors 214 and 216 so a reasonably-linear opacity-metering response can be maintained for "on-scale" meter responses to opacity changes. The photocell-driver-lamp 82 should preferably be operated at less than the manufacturers' "rated" potential for example at 80 percent of the "rated" potential to relatively reduce the blue light emission and thereby reduce the sensed-fluid turbidity-induced opacity-masking and refraction variation instability effects. Operation of the lamp at such reduced potentials also serves to extend rated lamp life many times and thus to extend calibration stabilities accordingly. The variable tap meter zero balancing resistor 208 interconnecting the two photo-resistive photocells 94 and 102, should have a resistance not exceeding 10 percent of the normal resistance of the photocells, for example 1,000 ohms, for both good fine zero adjustability and good photocell sensitivity retention. By using a meter 210 of such high metering-coil impedance, the full-scale-calibration sensitivity-range resistors 214 and 216 can have high resistances, such as 25,000 ohms or higher, thereby reducing the loading effect of the meter 210 on the photo-resistive photocell differential-impedance output network which in turn reduces errors from loading changes on the potential-regulated power supplies 204 and 206 and improves photocell response-stability and measurement-linearity.

The circuit of FIG. 3, by eliminating amplifiers between the photocells and the indicating meter and by having the opacity meter zeroing at an adjustment of the resistor 208 tap point corresponding to exactly zero potential, effectively prevents interaction between the opacity metering zero adjustment and the full scale range-calibration adjustment at the opacity meter zero point and enables the simplified and free use of multiple range calibration resistors such as 214 and 216.

While the stability, sensitivity, and accuracy objectives of the circuit of FIG. 3 may be achieved as previously described, the further objectives of this invention for very long life, very high reliability, rapid easy low-cost testing, fast easy fault location, fast easy field maintenance and repairs, fast easy minimized calibration, low down time, immunity to chain failure of components, slow calibration drifts, and practical periodic preventative maintenance requires circuitry and component types which enable the attainment of all of these objectives simultaneously, preferably in an economical and reasonably compact maner. The now preferred specific circuitry details and component types which simultaneously achieve all of these objectives are further outlined in FIGS. 4–8.

Referring to FIG. 4, the now preferred detailed circuit for a pair of plus or minus 0.02 percent stabilized potential-supplies 204 and 206 comprises: (a) long life reliable low-forward-drop power-rectifying diodes 230, 232, 234, and 236, for example type 1N2864A diodes, with high current-surge capacities to enable, in conjunction with the sensing circuit "keep-alive" feature, the elimination of capacitor turn-on charging-surge resistors thereby reducing capacitor ripple and improving regulation, (b) long life reliable large-capacitance ripple-integrating capacitors 240 and 242, for example of 500 micro-farads capacitance for integrating the full-wave-rectified output ripple of the rectifying diodes 230, 232, 234 and 236 connected to transformer 202 which has for example an output of 36 volts R.M.S. center-tapped, (c) reliable long life capacitor-discharge resistor 238, for example of 5,000 ohms resistance, to rapidly discharge capacitors 240 and 242 in the event the "keep-alive" circuit of the opacity metering system is turned off for any reason This protects the coil of the meter 210 from excessive turnoff-transient overloads and protects maintenance personnel from accidental burns and capacitor blowup which could occur if either capacitor 240 or 242 is accidentally shorted during maintenance, (d) reliable long life first-cascade-regulator-stage potential-dropping resistors 244 and 246, for example of 500 ohms resistance to carry the desired current at the desired potential drop to the first-cascade-regulator-stages comprised of Zener diode regulators 248 and 250, (e) reliable long life first-cascade-stage Zener-diode potential-regulators 248 and 250 of suitable variable-current shunting-dissipation, low dynamic-impedance, and suitable regulating-potential-rating, for example 1 watt dissipation 12 volt 24 dynamic ohm avalanche-type regulating diodes, to provide a high degree of first-stage ripple-reduction and regulation-stabilization, (f) reliable long life second-cascade-stage potential-dropping resistors 252 and 254, for example of 500 ohms resistance, to carry the desired current at the desired potential-drop to the second-cascade-stages Zener-diode potential-regulators 256 and 258, (g) reliable long life second-cascade-stage Zener-diode potential-regulators 256 and 258 of suitable current-shunting dissipation, low dynamic-impedance, and suitable regulating-potential-rating, for example 1 watt dissipation 6 volt 9 dynamic ohm avalanche type regulating diodes, to achieve the final high degree of potential-regulation-stability to photocells 94 and 102 such as plus or minus 0.02 percent line and load regulation stability.

Referring to FIG. 5, the now preferred detailed circuit for a plus or minus 0.02 percent stabilized constant current supply 218, it comprises: (a) reliable long life low-forward-drop power-rectifying diodes 260 and 262, for example type 1N2864A diodes, with high surge-current capacities to enable, in conjunction with the sensing circuit "keep-alive" feature, the elimination of capacitor turn-on charging-surge resistors thereby reducing capacitor ripple and improving regulation, (b) reliable long life large-capacitance ripple-integrating capacitor 268, for example of 500 microfarad capacitance, for integrating the full-wave-rectified output ripple of the rectifying diodes 260 and 262 connected to transformer 202 which has for example an output of 36 volts R.M.S. center-tapped, (c) reliable long life capacitor-discharge resistor 264, for example of 2,500 ohms resistance, to rapidly discharge capacitor 268 in the event the "keep-alive" circuit of the opacity metering system is turned off for any reason. This protects meter 210 from prolonged turn-off transients and protects maintenance personnel from accidental burns and capacitor blowup which could occur if capacitor 268 is accidentally shorted during maintenance, (d) reliable long life current-sensing negative-potential reference-regulator, for example plus or minus 0.02 percent stability, comprised of resistors 270 and 278 and Zener diodes 274 and 282 similar in principle or even identical in all respects to the negative-potential regulator of FIG. 4 comprised of resistors 246 and 254 and Zener diodes 250 and 258 respectively, (e) reliable long life pilot-current positive potential reference-regulator, of for example plus or minus 0.02 percent stability, comprised of resistors 272 and 285 and Zener diodes 276 and 284 similar in principle or even identical in all respects to the positive-potential regulator of FIG. 4 comprised of resistors 244 and 252 and Zener diodes 248 and 256 respectively, (f) reliable long life high D.C.-amplification-factor positive-reference potential-follower transistor 288, for example NPN type 2N1308, which follows the stable positive reference-potential of Zener potential-reference regulating diode 284 to establish a similar stable potential-drop across stable resistor 286 and to thereby establish a highly stable corresponding collector-current in transistor 288 to act as a highly constant pilot turn-on current for transistors 300 and 302, (g) reliable long life highly stable type resistor 286, for example of 50,000 ohms resistance, which in conjunction with transistor 288 and Zener diode 284, by its constant resistance and potential drop sets a highly-constant turn-on current from the collector of transistor 288 to transistor 300, (h) reliable long life low-leakage transient-bypass capacitor 290, for example of 0.1 microfarad capacitance, to stabilize the current-regulation of the circuit by by-passing transients in the D.C. drive-current to transistor 300, (i) reliable long life high-D.C.-current-gain reference-difference impedance-reducing PNP driver transistor 300, for example type 2N1309, to match the sensed-reference-difference-current to the base-to-emitter-impedance of variable-impedance lamp-current regulating-transistor 302, (j) reliable long life high-D.C.-current-gain high-input-impedance potential-difference-sensing PNP transistor 292, for example type 2N1309, which senses the potential-difference between the highly stable negative-reference-potential across Zener potential-reference diode 282 and the lamp-current-induced potential-drop across highly-resistance-stable lamp-current-sensing resistor 308 and which accordingly loads out the necessary portion of the highly-stabilized constant pilot turn-on current from the collector of transistor 288 to the base of transistor 300 such as to automatically maintain a constant potential-drop across and thereby a constant lamp-current through stable-resistance power resistor 308, (k) reliable long life base drive overload protection resistor 298, of for example 1,000 ohms resistance, to protect transistor 292 from base-drive overloads during turn-on and turn-off and under other normal transient conditions, (l) transient-bypass network comprised of resistor 296 and low-leakage capacitor 294, for example of 1,000 ohms resistance and 0.1 microfarad capacitance respectively, to bypass transients and A.C. in the base-drive of pilot-current loadout-transistor 292, (m) reliable long life potential-dropping high-heat-dissipation power resistor 306, of for example 20 ohms resistance, to protect current-sensing resistor 308 during turn-on transients or during circuit failures where lamp current regulating transistor 302 has insufficient potential drop from emitter to collector. Resistor 306 also serves to reduce the amount of normal potential-drop across and the amount of power dissipated in transistors 300 and 302, (n) reliable long life high-D.C.-current-gain high-power-dissipation PNP power-transistor 302, for example of type 2N2869, which, following the guidance of the potential-comparing pilot current load-out transistor 292, serves as a variable-potential-dropping impedance so as to absorb the proper amount of potential-drop so that the photocell-driver-lamp current remains constant, (o) reliable long life high-dissippation power-resistor 303, for example of 100 ohms resistance, to carry most of the current to the photocell-driver-lamp and thereby unload transistor 302 from having to dissipate as much power and thereby lengthen its life and increase its transient accommodating and overload capacity, (p) reliable long life low thermal-coefficient precision power-type current-sensing resistor 308 of such resistance as is required to set the regulated current-level to photocell-driver-lamp 82 so the photocells 94 and 102 are illuminated to the desired impedance level. For example the resistor 308 might have a resistance of 55 ohms, a low temperature coefficient of 20 parts per million per degree centigrade of temperature change, and a stability of plus or minus 0.02 percent.

In order to insure low maintenance, high reliability, long life, immunity to shorting of the outputs of the regulated potential and current supplies 204, 206, and 218, and immunity to chain-sequence component-failures, line-potential regulating-transformer 200 should be of a self-protecting type which automatically drops its output potential to safe self-protecting level in the event that a circuit component in a dependent circuit fails by shortout so as to overload transformer 200 beyond its normal power-rating which in turn is purposely selected for little excess power capacity, for example a power capacity of 15 watts. Transformer 202 should be selected with sufficient excess dissipation and current capacities so any short-out failures in said power supplies will be reflected back to self-protecting transformer 200 without damage to transformer 202, thereby causing transformer 200 to drop its output-potential to protect both transformers 200 and 202 and the potential and current supplies 204, 206, and 218 and thereby minimize the chance of chain-failures therein. All resistor dissipations, Zener-diode dissipations, rectifying-diode current-capacities, photocell dissipations, capacitor potentials, transistor potentials, transistor dissipation, shunting-diode current-capacities, switching-contact current-capacities, and coil-dissipations of the components used in these optical blood detector opacity-change detecting and over ranging alarm circuits should be very conservatively applied with sufficient power dissipation and potential derating to insure that startup, turnoff, and other normal transients can not induce component failures and so that shortout-failures of another component can not induce a chain type failure in the said component. In addition, this component derating practice extends component life, minimizes thermal-drifts, minimizes component-characteristic change-rates from aging-deterioration, minimizes downtimes, and facilitates practical preventative-maintenance schedules. All resistive calibration and opacity-zeroing controls should be rapidly accessible but of recessed adjustment-locking types to insure maximum stability and to discourage tinkering by unauthorized personnel. As may be seen from the now proferred electrical circuit, all circuit parameters necessary for rapid routine maintenance are measurable either as potentials or as resistances so as to facilitate testing and maintenance with commonplace simple high-sensitivity volt-ohm meters. Wherever regulated-potential stabilities are beyond the sensitivity or accuracies of such common place volt-ohm meters, the circuit design is of such a nature that if all of the proper nominal potentials and resistances are present the proper circuit stabilities should be present also. The meter over-range set-point power-switching slave-unit should preferably be of a solid-state component type driving an included high reliability long life relay with resistor capacitor contact-arc suppression to enhance alarm circuit reliability. Meter-relay 210 should preferably be of the optical meter relay type to enhance over-ranging-alarm-set-point sensing-life since the set points are usually the most unreliable feature of other types of meter-relays such as electrical contact type meter-relay types.

The current regulating circuit of FIG. 5 may also be made in an opposite polarity configuration by reversing the terminal polarities of the diodes, by using PNP transistors in place of the NPN transistors shown in FIG. 5, and by using NPN transistors in place of the PNP transistors shown in FIG. 5.

The bubble-response time-delay circuit may be both simple and reliable as shown in FIG. 6. The delay-circuit comprises simply a normal-open thermal-heater-actuated switch contact 312 which is closed only after time-delaying resistive thermal-heated bimetallic actuator-element 310 has been heated sufficiently. By selecting the proper heating-element resistance and bimetallic actuator such a delay circuit can provide a suitable delay in the range of a few seconds to a few minutes. In the now-preferred circuit a time-delay of the order of five seconds was found to be satisfactory. Larger flow-chambers and longer flow-paths may require longer time-delay-delays. Because time-delay devices of this nature tend to tease, that is to slow down the opening of, switch 312 and thus accentuate the arcing and burning of its contacts it is desirable to maximize its life with a resistive-capacitative arc-suppression network 318 and 316 respectively if the alarm-circuit load 220 is inductive. Capacitor 316 should be of sufficient capacitance to store all of the inductive load-energy of the alarm-circuit 220 at a potential low enough to eliminate undesirable arcing of the contacts of switch 312. Resistor 318 should have a high enough resistance so that contacts of switch 312 will not be overloaded by the discharge of capacitor 316 on rapid cycling reclosure of switch 312 and must also be high enough so the A.C.-power leaking through the arc-suppression resistor-capacitor network 318–316 will not actuate the alarm device. The resistive capacitative RC time-constant of arc-suppressor network 318–316 should be kept smaller than the inductive alarm circuit L/R time-constant so that the inductive momentum-energy of the alarm circuit can be absorbed effectively by the suppressor network 318–316 to minimize contact-arcing damage. Since the meeting of the time-constant criteria and the resistance criteria simultaneously may require the compromise use of a smaller capacitance for capacitor 316 and a larger contact potential-breaking rating for switch 312, alarm device load-inductances should be kept low and the potential rating of capacitor 316 must be kept high so the capacitor can store the necessary inductive energy without punch-through of the capacitor dielectric.

The now preferred safety auto-resetting temporary alarm-disable circuit 224 of FIG. 7 comprises a temporary-disable momentary contact disable initiation switch 320 and a reliable long life preferably fast-acting single-pole double-throw electrical contact relay, whose contact-lives are preferably extended by resistor-capacitator arc-suppression networks similar in principle to that shown in FIG. 6 for bubble time-delay switch 312. The temporary alarm-disable initiating switch 320, when closed momentarily, actuates relay-coil 321 which then opens the normal-closed contacts of relay switch contacts 322 to disable the alarm circuit 220 and also closes the normal-open contacts of relay switching contacts 322 to electrically interlock the relay coil 321 and thereby keep the alarm-circuit disabled for as long as the over-range alarm signal from meter-relay 210 persists continuously. As soon as the alarm condition is interrupted momentarily the meter slave-unit 222 breaks the power to the electrical interlocking normal open contact of the temporary alarm disable relay switching contacts 322, relay coil 321 is deactivated, and the normal-closed contacts 322 again close to re-enable the alarm circuit 220, subject to the control of inter-usage alarm power turnoff switch 226, meter-relay power-switching slave-unit 222, and bubble-response time-delay circuit 224.

The metering-coil of meter-relay 210 must be protected against excessive overloads such as may occur accompanying severe over-range opacity changes, turn-on and turn-off transients, calibration adjustments, and maintenance-procedures carried on while the "keep-alive" circuit-stabilization feature is functioning. The simple bipolar overcurrent-shunting circuit 211 as shown in FIG. 7 comprises two high-current-capacity low forward drop germanium instrument-diodes connected with opposing polarities in parallel, for example diode types 1N91.

In order to make the opacity sensing circuitry more fail-proof in the sense that it will automatically actuate the over-range alarm circuit in the event of severe failures of components which not normally replaced on a safe-preventive-maintenance schedule, the meter-relay 210 should also be provided with a second alarm-set-point which will alarm on reversed or subnormal-opacity indications to the subnormal-opacity side of meter-zero. The few parts liable to failures which will not actuate the alarm such as the photocell-driver-lamp 82, optical-ports, and alarm circuit relays with arcing contacts should be of a quickly replaceable type to shorten down-times in emergencies and should be replaced periodically on a safe periodic-maintenance schedule to insure maximum reliability.

The system described above may be factory adjusted, field calibrated, and operated as follows:

At the time of original manufacture, the manufacturer selects the resistance of the lamp current-regulator current sensing resistor 308 to stabilize the photocell-driver-lamp intensity at the proper level and selects an optical aperture, mask, or neutral density filter for insertion into the lightbeam path to the reference-photocell 94 in conjunction with optical port 86 to balance out unbalanced light-beam paths and to balance out normal manufacturing-variances in the components of the optical opacity-change detector. Field calibration, operation, and maintenance should not normally require further modification of these manufacturing adjustments. Normal effluent from a dialyzer is passed through member 18 from inlet port 20 to outlet port 24. The effluent will have a normal opacity of substantially constant value or of a value which may vary from day to day or from one dialysis procedure to the next. Full-scale sensitivity-range selection-switch 212 is closed to complete a monitoring circuit through the appropriate preferably most sensitive full-scale sensitivity-range calibration-resistance such as 214 and 216. The fine-metering-zero-adjustment resistor-tap of resistor 208 is first centered then previously centered coarse-zero adjustment-screw 93 is adjusted to vary the amount of light to photocell 94 so as to vary the impedance of photocell 94 until meter 210 reads approximately zero opacity-change. Next the fine-zeroing tap of resistor 208 is adjusted to accurately zero meter 210. The system is now zeroed for the normal operating opacity of the fluid passing through member 18. This manner of fine-zeroing the meter for a normal fluid opacity can be quickly performed at the beginning of each operating run, without disturbing the preset calibrations of the full-scale sensitivity-calibration and test resistors 214, 216, and 219, and can be performed quickly by non-skilled operating-personnel since the end result i.e. an indicating-meter-zero-reading is easily observed and since the adjustment requires no special tools or instruments. Full-scale sensitivity-range calibration-resistors 214 or 216 may be easily field-calibrated by passing dialysate effluent, containing the desired amount of blood for full-scale meter-deflection, through member 18 until the meter reading is stably maximized then setting the appropriate calibration-resistor 214 or 216 for an exact full-scale reading. Once set and locked, these full-scale range-calibrations are highly stable and need not be changed or checked frequently unless patients with widely varying blood opacities are being treated with the same equipment. After the full-scale sensitivity-range resistors 214 and 216 have been calibrated for full-scale deflection on appropriate blood in dialysate effluent streams through member 18, normal effluent dialysate without blood contamination should be stably reestablished whereupon momentary-contact switch 217 may be held closed and full-scale-deflection and calibration-test resistor 219 may be adjusted for full-scale-deflection while switch 212 is set to the most sensitive full-scale sensitivity-range. Once set, this calibration is stable until the circuit ages considerably or until the full-scale sensitivity-range calibration-resistors 215 or 216 requires recalibration. The precalibrated resistor 219 may be momentarily shunted into the circuit by momentary contact switch 217 at any time the operator becomes suspicious that the circuit is not functioning properly or that someone might have tampered with the full-scale range-sensitivity calibration-resistors 214 or 216. If everything is satisfactory the proper test-change will be observed as the expected deflection of meter 210. The meter-relay over-range alarm-set-points are then set for the proper high and low limiting values at which an alarm condition is to occur. The high end limiting value should correspond to that number of parts of blood per million parts of dialysate effluent passing through member 18 which require corrective action by operating personnel for example at 10 parts per million of blood in dialysate effluent. The low end limiting value should correspond to the amount of dialysate opacity reduction which can be tolerated without having to rezero the opacity meter 210 with the fine-zeroing tap of resistor 208. Adjustable resistances 214 and 216 have different values to provide a choice of full-scale metering-sensitivity ranges for example of 50,000 ohms and 250,000 ohms respectively to provide full-scale sensitivity-ranges for example of 50 parts per million and 200 parts per million respectively of blood in dialysate effluent. Whenever a blood leak exceeding the extent of the predetermined alarm set point occurs, the alarm circuit 220 is triggered after a suitable delay through the bubble-response time-delay circuit 228. Bubble-response time-delay circuit 228 delays enabling the alarm signal for a few seconds to further insure that the presence of short trains of air bubbles or other temporary fluid disturbances will not trigger the alarm. After an alarm has been effected, the automatic safety resetting temporary alarm-disable circuit 224 can be actuated to disable the alarm 220 while corrective action is taken. As soon as the alarm condition has been cleared, even temporarily, the automatic reset functions and automatically re-enables the alarm circuit 220 so it can respond to new alarm conditions as they occur.

Whenever a dialysis procedure is not in progress, switches 212 and 226 can be opened to turn off the meter coil and meter power-switching slave-unit and the dependent alarm circuits so as to prevent false alarms and so as to prolong the useful life of these components while at the same time keeping the drift-sensitive long life components of the opacity-change measuring-circuit turned on and stabilized and ready for an immediate switch-on and use of the entire optical opacity change detector system on short notice without further warmup.

When the optical ports 50 and 52 are to be removed for preventative maintenance and when corrosive dialysate-effluent must be drained from the fluid flow chamber 18 the fluid in member 18 can be drained through line 32.

The exemplar circuit component parameters given herein constitute a now-preferred version of a detailed circuit suitable for the requirements of the basic circuit of FIG. 3.

It is believed that the invention will have been clearly understood from the foregoing description of my now-preferred illustrated embodiment. Changes in the details of construction may be resorted to without departing from the spirit of the invention and its accordingly my intention that no limitations be implied and that the hereto annexed claims be given the broadest interpretation to which the employed language fairly admits.

The embodiments of the invention in which an exclusive property or privilege is claimed are defined as follows:

1. A fluid opacity change sensing apparatus which comprises a tubular member having fluid inlet and outlet ports and an upper wall sloping upwardly from said fluid inlet port to said fluid outlet port; means providing fluid-retaining optical ports at opposite ends of said tubular member in general horizontal alignment below said fluid inlet and outlet ports; means providing a light source adjacent one optical port, a sensing photocell adjacent the other optical port for sensing light transmitted from said light source and through said optical ports and said tubular member, a reference photocell, and means responsive to the differential impedance output of the two photocells to indicate changes in opacity of fluid passing through said tubular member; means within said tubular member to direct fluid along an elongated generally-horizontal fluid flow path aligned with said optical ports, to direct an optical beam from said light source through said fluid flow path and to permit bubbles entrained in such fluid to bypass said elongated fluid flow path and to flow unobstructed along the inner surface of said upper wall from said inlet port to said outlet port.

2. Apparatus according to claim 1 wherein said means within said tubular member comprise anti-reflection and fluid flow directing baffles transversely positioned in said tubular member and provided with open fluid flow directing and optical beam directing apertures therethrough aligned with said optical ports, the upper edges of said baffles terminating below the tubular member upper wall such that the inner surface of said upper wall is unobstructed from said fluid inlet port to said fluid outlet port.

3. A fluid opacity change sensing apparatus which comprises means providing a light source; a sensing photocell spaced from said light source; means providing an elongated fluid flow path between said light source and said photocell with fluid-retaining optical ports positioned such that light can pass from said light source through said fluid flow path to said sensing photocells; a reference photocell spaced from said light source; symmetric error compensating opposing polarity potential supply means energizing said photocells; means responsive to the differential impedance output of the two photocells to indicate changes in opacity of fluid passing through said fluid flow path comprising an indicating meter, and a resistance connected in series with the output ends of the photocells and having a continuously-variable tap electrically connected to the meter input so as to provide fine zeroing of the meter for the normal opacity of the flowing fluid; the potential source circuit for said photocells comprising power rectifying diode means cross-connected between positive and negative sides of such circuit and capacitance means for integrating the full wave rectified output of the rectifying diode means, first cascade regulator means including positive side and negative side potential dropping resistors, and Zener diode potential regulators connected between the positive and negative sides of such circuit, second cascade regulator means including positive side and negative side potential dropping resistors, and Zener diode potential regulators connected between the positive and negative sides of such circuit, and a negative output from said second cascade regulator means electrically connected to one photocell, and a positive output from said second cascade regulator means electrically connected to the other photocell.

4. A fluid opacity change sensing apparatus which comprises means providing a light source comprising a constant current supply including a current-sensing potential reference regulator of first polarity, a constant-current-sensing potential reference regulator of second and opposite polarity, an impedance-reducing driver transistor, a second polarity reference-potential follower-transistor electrically connected to the second opposite polarity potential reference regulator and to the base of base of said driven transistor to establish a stable collector current therein as a constant pilot turn-on current for said driver transistor, a potential difference sensing transistor electrically connected to the first polarity potential reference regulator, to a sensing resistor in series with the light source, and to the base of said driver transistor to load out the constant pilot turn-on current to the base of said driver transistor, and a power transistor electrically connected to said driver transistor and in series with the light source so as to absorb sufficient potential drop to maintain a constant current to said light source; a sensing photocell spaced from said light source; means providing an elongated fluid flow path between said light source and said photocell with fluid-retaining optical ports positioned such that light can pass from said light source through said fluid flow path to said sensing photocell; a reference photocell spaced from said light source; means responsive to the differential impedance output of the two photocells to indicate changes of opacity of fluid passing through said fluid flow path.

5. Apparatus according to claim 1 including a first dehydratable optical chamber removably and hermetically sealable to one fluid-retaining optical-port-containing end of said tubular member and adapted to removably mount said light source opposite said adjacent fluid retaining optical port and to removably mount said reference photocell so as to compensate for small light intensity variations from said lamp; and including a second dehydratable optical chamber removably and hermetically sealable to the opposite fluid retaining optical-port-containing end of said tubular member and adapted to removably mount said fluid opacity change sensing photocell opposite the adjacent fluid retaining optical port.

References Cited

UNITED STATES PATENTS

| | | | |
|---|---|---|---|
| 2,654,845 | 10/1953 | Presenz | 250—218 |
| 2,991,688 | 7/1961 | Schneider | 250—218 |

RALPH G. NILSON, Primary Examiner

MARTIN ABRAMSON, Assistant Examiner